United States Patent [19]

Nagai et al.

[11] Patent Number: 5,530,063
[45] Date of Patent: Jun. 25, 1996

[54] ROOM TEMPERATURE CURABLE ORGANOPOLYSILOXANE COMPOSITION

[75] Inventors: Kazukiyo Nagai, Kawasaki; Tsuneo Kimura; Masatoshi Arai, both of Annaka, all of Japan

[73] Assignee: Shin-Etsu Chemical Co., Ltd., Tokyo, Japan

[21] Appl. No.: 260,728

[22] Filed: Jun. 15, 1994

[30] Foreign Application Priority Data

Jun. 15, 1993 [JP] Japan .................. 5-168526

[51] Int. Cl.$^6$ .................................................. C08F 8/12
[52] U.S. Cl. .................. 525/101; 525/100; 525/102; 525/103
[58] Field of Search ........................... 525/100, 101, 525/102, 103

[56] References Cited

U.S. PATENT DOCUMENTS 4,543,403  9/1985  Isayama ................................. 525/263
4,657,986  4/1987  Isayama et al. ....................... 525/407

FOREIGN PATENT DOCUMENTS 400303   12/1990  European Pat. Off. .
1094087  12/1967  United Kingdom .
1174097  12/1969  United Kingdom .

*Primary Examiner*—Ralph H. Dean
*Attorney, Agent, or Firm*—Oblon, Spivak, McClelland, Maier & Neustadt

[57] ABSTRACT

A room temperature curable organopolysiloxane composition comprising:
(A) an organopolysiloxane blocked by a silanol group or hydrolyzable silyl group at a terminal end of molecular chain thereof;
(B) a polymer of a monomer having an ethylenically unsaturated double bond;
(C) an epoxy compound;
(D) a curing agent for the component (C); and
(E) a curing catalyst for the component (A). The composition exhibits extremely higher adhesive properties for adhesion to various adherends, as compared to those conventional compositions which comprise an adhesion-imparting agent such as silane coupling agents or the like.

10 Claims, No Drawings

ROOM TEMPERATURE CURABLE ORGANOPOLYSILOXANE COMPOSITION

BACKGROUND OF THE INVENTION

1. Field of the Invention

The present invention relates to a room temperature curable organopolysiloxane composition which is useful as constructional sealing material, coating material, encapsulating or potting material for electric and electronic components, fiber-treating agent, adhesive for automotive, constructional and electric or electronic uses, and so forth.

2. Description of the Prior Art

Condensation-curing type room temperature curable organopolysiloxane compositions, with their excellent adhesive properties as well as excellent heat resistance, weatherability, chemical resistance, etc., are used, for example, as an adhesive for areas where vibration-proofing properties are required in the fields of electric and electronic industry and construction materials.

In such applications, the condensation-curing type room temperature curable organopolysiloxane compositions are desired to high adhesive strength, specifically an adhesive strength under shear of not less than 50 kg/cm² for adherends. In order to enhance the adhesive strength of such compositions, therefore, addition of an adhesion-imparting agent such as a silane coupling agent or the like to the compositions has been widely practiced. According to this method, however, the adhesive strength under shear for such adherends as glasses and aluminum that can be attained is on an unsatisfactory level of about 10 to 30 kg/cm².

SUMMARY OF THE INVENTION

It is accordingly an object of the present invention to provide a room temperature curable organopolysiloxane composition having excellent adhesive properties and a cured product of the same.

According to the present invention, a hydrolyzable silyl group-containing organopolysiloxane composition comprises an epoxy compound, added as an adhesion-improving component, and further comprises a polymer of a monomer having an ethylenically unsaturated double bond, added as a component for improving compatibility between the organopolysiloxane and the epoxy compound, whereby the above object is attained successfully.

Namely, the present invention provides a room temperature curable organopolysiloxane composition comprising:
(A) an organopolysiloxane blocked by a group selected from the group consisting of a silanol group and a hydrolyzable silyl group at a terminal end of molecular chain thereof;
(B) a polymer of a monomer having an ethylenically unsaturated double bond;
(C) an epoxy compound;
(D) a curing agent for the component (C); and
(E) a curing catalyst for the component (A), and a cured product obtained by curing the composition.

Thus, the composition of the present invention comprises an organopolysiloxane blocked by a hydrolyzable silyl group at both terminal ends of its molecular chain and also comprises an epoxy compound as an adhesion-improving component and, further, a polymer of a monomer having an ethylenically unsaturated double bond as a component for improving compatibility between the organopolysiloxane and the epoxy compound; with these components incorporated, the composition exhibits extremely higher adhesive properties for adhesion to various adherends, as compared to those conventional compositions which comprise an adhesion-imparting agent such as silane coupling agents or the like. In adhesion to such adherends as aluminum and iron, for example, the present composition exhibits an adhesive strength under shear of not less than 50 kg/cm².

Therefore, the composition of the present invention is useful, for example, as constructional sealing material, coating material, encapsulating or potting material for electric and electronic components, fiber-treating agent, adhesive for automotive, constructional and electric or electronic uses, and so forth.

DETAILED DESCRIPTION OF PREFERRED EMBODIMENTS (A) Silanol group- or hydrolyzable silyl group-containing organopolysiloxane The organopolysiloxane of component (A) is an organopolysiloxane blocked by a silanol group or hydrolyzable silyl group at a terminal end of molecular chain thereof, and serves as a major component of the composition according to the present invention.

The organopolysiloxane (A) includes, for example, compounds having the following general formula (1):

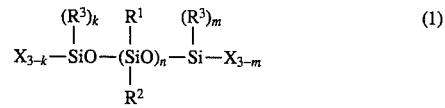

wherein
$R^1$ may be the same or different and are each a substituted or unsubstituted monovalent hydrocarbon group having 1 to 12 carbon atoms, exemplified by alkyl groups such as methyl, ethyl and propyl, cycloalkyl groups such as cyclohexyl, alkenyl groups such as vinyl and allyl, aryl groups such as phenyl and tolyl, and groups derived from these groups by substitution of part of the hydrogen atoms with halogen atoms or the like;

$R^2$ may be the same or different and are each a substituted or unsubstituted monovalent hydrocarbon group having 1 to 12 carbon atoms, exemplified by the same groups as mentioned above for $R^1$;

$R^3$ stands for a substituted or unsubstituted monovalent hydrocarbon group having 1 to 6 carbon atoms, exemplified by the same groups as mentioned above for $R^1$ (except the tolyl group), provided where a plurality of $R^3$ groups are present they may be the same or different;

X may be the same or different and are each a hydroxyl group or a hydrolyzable group exemplified by alkenyloxyl groups having 3 to 6 carbon atoms such as isopropenyloxyl and isobutenyloxyl, ketoxime groups such as dimethyl ketoxime group and methyl ethyl ketoxime group, alkoxyl groups having 1 to 5 carbon atoms such as methoxyl, ethoxyl and butoxyl, acyloxyl groups having 2 to 5 carbon atoms such as acetoxyl, primary and secondary amino groups having an alkyl group of 1 to 6 carbon atoms such as N-butylamino group and N,N-diethylamino group, amide groups such as N-methylacetamide group, as well as carboxyl group and so forth;

k and m may be the same or different and are each an integer of 0 to 2; and n is an integer of not less than 10.

Among the groups usable as $R^1$ in the general formula (1), preferred are methyl and phenyl in view of good availability and favorable handleability of compounds.

The organopolysiloxane of component (A) preferably has a viscosity at 25° C. of 25 to 1,000,000 cSt, more preferably 500 to 100,000 cSt.

Specific examples of the organopolysiloxane of component (A) include the following compounds. In the following, Me stands for the methyl group, Et the ethyl group, Ph the phenyl group, Vi the vinyl group, Pr the propyl group, Ac the acetyl group, Bu the butyl group, and Hex the hexyl group, and, unless otherwise specified, l, m and n are each an integer of not less than 0, provided that l+m+n is at least 15.

$(MeO)_3SiO(Me_2SiO)_nSi(OMe)_3$, $(MeO)_2MeSiO(Me_2SiO)_nSiMe(OMe)_2$, $(MeO)_2ViSiO(Me_2SiO)_nSiVi(OMe)_2$, $(MeO)_2PhSiO(Me_2SiO)_nSiPh(OMe)_2$, $(EtO)_3SiO(Me_2SiO)_nSi(OEt)_3$, $(EtO)_2MeSiO(Me_2SiO)_nSiMe(OEt)_2$, $(EtO)_2ViSiO(Me_2SiO)_nSiVi(OEt)_2$, $(PrO)_2PhSiO(Me_2SiO)_nSiPh(OPr)_2$, $(MeEtC=N-O)_3SiO(Me_2SiO)_nSi(O-N=CEtMe)_3$, $(MeEtC=N-O)_2MeSiO(Me_2SiO)_nSiMe(O-N=CEtMe)_2$, $(MeEtC=N-O)_2ViSiO(Me_2SiO)_nSiVi(O-N=CEtMe)_2$, $(MeEtC=N-O)_2PhSiO(Me_2SiO)_nSiPh(O-N=CEtMe)_2$,

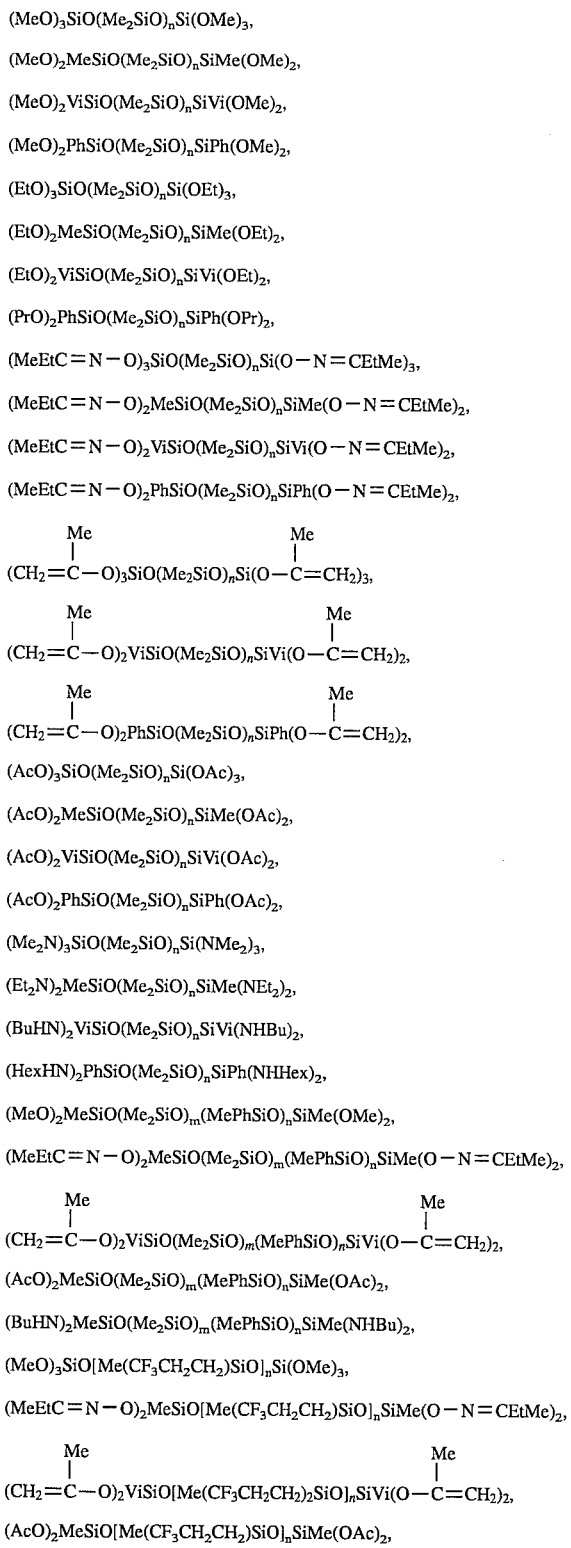

$(AcO)_3SiO(Me_2SiO)_nSi(OAc)_3$, $(AcO)_2MeSiO(Me_2SiO)_nSiMe(OAc)_2$, $(AcO)_2ViSiO(Me_2SiO)_nSiVi(OAc)_2$, $(AcO)_2PhSiO(Me_2SiO)_nSiPh(OAc)_2$, $(Me_2N)_3SiO(Me_2SiO)_nSi(NMe_2)_3$, $(Et_2N)_2MeSiO(Me_2SiO)_nSiMe(NEt_2)_2$, $(BuHN)_2ViSiO(Me_2SiO)_nSiVi(NHBu)_2$, $(HexHN)_2PhSiO(Me_2SiO)_nSiPh(NHHex)_2$, $(MeO)_2MeSiO(Me_2SiO)_m(MePhSiO)_nSiMe(OMe)_2$, $(MeEtC=N-O)_2MeSiO(Me_2SiO)_m(MePhSiO)_nSiMe(O-N=CEtMe)_2$,

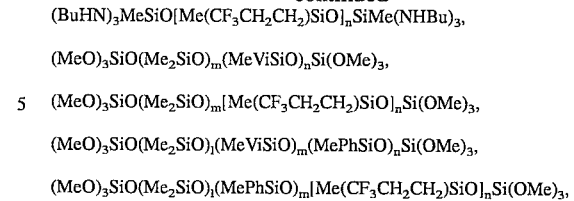

$(AcO)_2MeSiO(Me_2SiO)_m(MePhSiO)_nSiMe(OAc)_2$, $(BuHN)_2MeSiO(Me_2SiO)_m(MePhSiO)_nSiMe(NHBu)_2$, $(MeO)_3SiO[Me(CF_3CH_2CH_2)SiO]_nSi(OMe)_3$, $(MeEtC=N-O)_2MeSiO[Me(CF_3CH_2CH_2)SiO]_nSiMe(O-N=CEtMe)_2$,

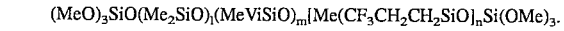

$(AcO)_2MeSiO[Me(CF_3CH_2CH_2)SiO]_nSiMe(OAc)_2$,

-continued $(BuHN)_3MeSiO[Me(CF_3CH_2CH_2)SiO]_nSiMe(NHBu)_3$, $(MeO)_3SiO(Me_2SiO)_m(MeViSiO)_nSi(OMe)_3$, $(MeO)_3SiO(Me_2SiO)_m[Me(CF_3CH_2CH_2)SiO]_nSi(OMe)_3$, $(MeO)_3SiO(Me_2SiO)_l(MeViSiO)_m(MePhSiO)_nSi(OMe)_3$, $(MeO)_3SiO(Me_2SiO)_l(MePhSiO)_m[Me(CF_3CH_2CH_2)SiO]_nSi(OMe)_3$, and $(MeO)_3SiO(Me_2SiO)_l(MeViSiO)_m[Me(CF_3CH_2CH_2)SiO]_nSi(OMe)_3$.

(B) Polymer of a monomer having an ethylenically unsaturated double bond

The component (B) has the effect of improving compatibility between the component (A) described above and the component (C) described below.

As the component (B), polymers obtained by polymerizing a known monomer or monomers having an ethylenically unsaturated double bond can be used without any special restrictions. The polymers which can be used as component (B) include, for example, polymers of an olefin such as ethylene, propylene and butylene; polymers of a halogenated olefin such as vinyl chloride; polymers of a vinyl ester such as vinyl acetate; polymers of an aromatic group-containing vinyl compound such as styrene, vinylnaphthalene, and styrenes with a substituent group on a ring atom; polymers of a heterocycle-containing vinyl compound such as vinylpyridine; polymers of a monomer selected from the group consisting of ethylenically unsaturated double bond-containing carboxylic acids, such as acrylic acid and methacrylic acid, and esters and salts of an ethylenically unsaturated double bond-containing carboxylic acid, such as ethyl acrylate, butyl acrylate and methyl methacrylate; polymers of an amide group-containing vinyl compound such as acrylamide and methacrylamide; polymers of a cyano group-containing vinyl compound such as acrylonitrile and methacrylonitrile; polymers of an unsaturated aldehyde compound such as acrylaldehyde and methacrylaldehyde; polymers of a N-vinyl nitrogen-containing cyclic compound such as N-vinylcarbazole, N-vinylpyrrolidone and N-vinyl caprolactam; polymers of a vinylidene compound such as vinylidene fluoride, vinylidene chloride and vinylidene cyanide; polymers of a monomer selected from the group consisting of maleic acid, fumaric acid and their esters and anhydrides; polymers of a monomer selected from the group consisting of stilbene, indene and cumarone; polymers of a polyfunctional olefin compound such as allyl methacrylate, allyl acrylate, diallyl adipate, methallyl acrylate, methallyl methacrylate, vinyl acrylate, divinylbenzene and vinylcyclohexene; polymers of an ester of an acid selected from the group consisting of acrylic acid and methacrylic acid with a polyhydric alcohol, such as ethylene dimethacrylate, tetramethylene dimethacrylate and tetramethylene diacrylate; polymers of a diene compound such as 1,3-butadiene, isoprene and chloroprene; polymers of a vinyl group-containing silicon compound such as vinyltrimethoxysilane, vinyltriethoxysilane, γ-methacryloxypropyltrimethoxysilane and γ-acryloxypropyltrimethoxysilane; and so forth.

Among these, preferred are polymers of ethyl acrylate, methyl methacrylate, butyl acrylate, styrene, vinylnaphthalene, propylene and butylene.

Besides, the polymers for use as component (B) above may each be a homopolymer or a copolymer obtained by copolymerizing two or more monomers. Where a copolymer is used, it may have any of random, block, graft and the like structures. The polymer of component (B) is not limited in regard of molecular weight. Furthermore, the component (B)

may consists of only one polymer or comprise two or more polymers.

It is preferable that the polymer used as component (B) is a polymer which has been obtained by polymerizing a monomer or monomers in the presence of the component (A) and which is in the state of being dispersed in the component (A), because the use of such a polymer increases the effect of improving compatibility between the components (A) and (C). The polymer in the state just described can be produced easily by polymerizing the monomer for component (B) either in the component (A) or in a solution of the component (A) in an appropriate solvent, according to a known method.

The component (B) is present preferably in an amount of 20 to 250 parts by weight, more preferably 100 to 170 parts by weight, per 100 parts by weight of the component (A).

(C) Epoxy compound

The component (C) may be any of known epoxy compounds, there being no special restrictions. The epoxy compounds which can be used include, for example, epoxy resins such as glycidyl ether-bisphenol A type epoxy resins, glycidyl ether-bisphenol F type epoxy resins, glycidyl ether-tetrabromobisphenol A type epoxy resins, novolak type epoxy resins, m-aminophenol type epoxy resins, diaminodiphenylmethane epoxy resins, urethane-modified epoxy resins, alicyclic epoxy resins, aliphatic epoxy resins and the like; and epoxy group-containing compounds such as bis(p-glycidylphenyl)propane, N,N-diglycidylaniline, triglycidyl isocyanurate, polyalkylene glycol glycidyl ethers, polysiloxane glycidyl ethers, polysilane glycidyl ethers, epoxy-modified siloxane compounds (available under the trade names of KF105, X-22-163A, X-22-163B, X-22-163C, KF100T, KF101, X-22-169AS, X-22-169B, KF-102 and KF103, from Shin-Etsu Chemical Co., Ltd.) and so forth. These may be used either singly or in combination of two or more.

Among these epoxy compounds, preferred are glycidyl ether-bisphenol A type epoxy resins and epoxy-modified siloxane compounds. Particularly preferable examples of the glycidyl ether-bisphenol A type epoxy resins include those commercially available under the tradenames of Epikote 828 and 827 (from Yuka Shell K.K.), whereas particularly preferable examples of the epoxy-modified siloxane compounds include those commercially available under the tradenames of KF100T and KF102 (from Shin-Etsu Chemical Co., Ltd.). In order to ensure that three-dimensional crosslinking proceeds smoothly to give a satisfactory cured product, the epoxy compound of component (C) preferably has at least two epoxy groups in its molecule.

The epoxy compound (C) is preferably present in an amount of 1 to 99 parts by weight, more preferably 20 to 50 parts by weight, per 100 parts of the components (A), (B) and (C) in total.

(D) Curing agent for the component (C)

The component (D) is a curing agent for the above epoxy compound. The curing agent may be any of those known, there being no special restrictions.

The component (D) includes, for example, amine compounds such as polyamines, polyamide resins, dicyanediamide, imidazole and amino group-containing organosilicon compounds; acid anhydride compounds; phenolic resins; mercaptan compounds; Lewis acid complex compounds; and so forth. Among these, preferred are amino group-containing organosilicon compounds. These compounds may be used either singly or in combination of two or more.

The amino group-containing organosilicon compounds include, for example, a compound of which the basic skeleton is comprised of at least one of the structures represented by the following general formulas (2):

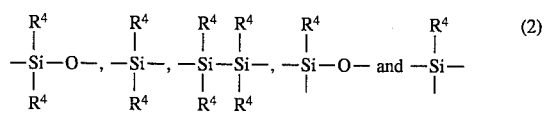

wherein $R^4$ stands for a group selected from the group consisting of alkyl groups such as methyl and ethyl, aryl groups such as phenyl, alkenyl groups such as vinyl and allyl, trifluoropropyl group, alkoxyl groups such as methoxyl, ethoxyl and isopropoxyl, amino groups, aminoxyl groups and acetoxyl groups, or the like, and in which an amino group is bonded to said basic skeleton either directly or through a linking group.

The amino group above may be any group selected from the group consisting of primary amino group, groups in which a primary amino group is protected in the form of a Schiff base, secondary amino groups and tertiary amino groups.

Specifically, the amino group includes, for example, the groups represented by

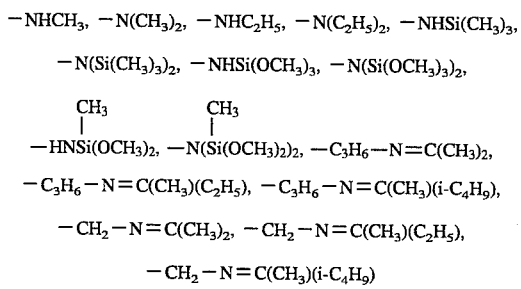

or the like, piperidine and so forth.

The linking group through which the amino group may be bonded to the above-described basic skeleton includes, for example, alicyclic groups, aromatic groups, aliphatic groups, combined groups of these, and so forth.

The amino group-containing organosilicon compound may have any of linear, branched and cyclic structures and their combinations. Besides, there are no special restrictions on the molecular weight of the organosilicon compound.

Specifically, the amino group-containing organosilicon compound includes, for example, the compounds represented by the following structural formulas:

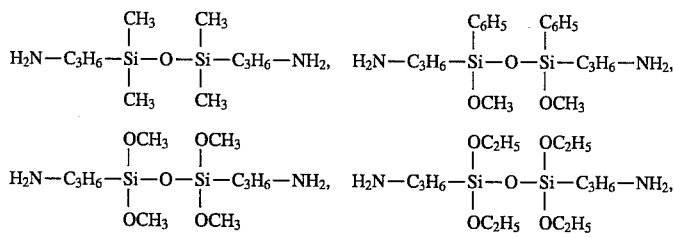

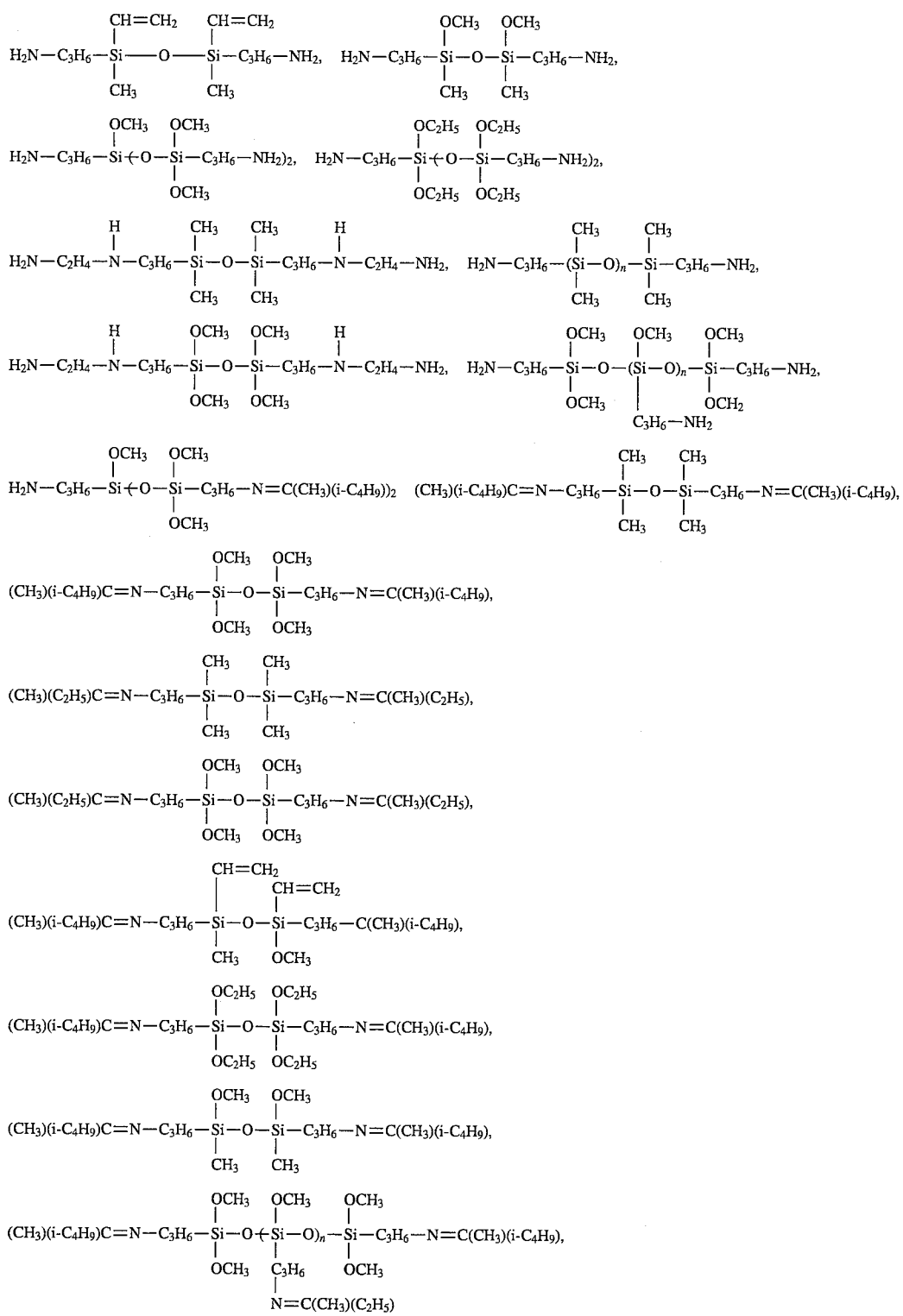

or the like. Further examples of the amino group-containing organosilicon compound include those commercially available under the tradenames of KF393, KF859, KF86, KF861, KF867, KF869, KF880, KF8002, KF8004, KF8005, KF864, KF865, KF868 and KF8003 (from Shin-Etsu Chemical Co., Ltd.).

The amount of the component (D) is preferably 0.01 to 200 parts by weight per 100 parts by weight of the component (C). Taking the cure rate of the composition, long-term shelf life of the composition in uncured state, economy and the like into special account, a more preferable range for the amount of the component (D) is 5 to 50 parts by weight.

(E) Curing catalyst for the silanol group- or hydrolyzable silyl group-containing organopolysiloxane (A)

As the component (E), which is a curing catalyst for the component (A), tin catalysts and titanium catalysts can be used, for example. More specifically, the component (E) includes, for example, organic tin compounds such as tin naphthenate, tin caprate, tin oleate, dibutyltin diacetate, dibutyltin dioctate, dibutyltin dilaurate, dibutyltin dioleate, diphenyltin diacetate, dibutyltin oxide, dibutyltin dimethoxide, dibutylbis(triethoxysiloxy)tin, dibutyltin benzyl maleate and the like; and titanic esters or titanium chelate compounds such as tetraisopropoxytitanium, tetra-n-butoxytitanium, tetrabis(2-ethylhexyloxy)titanium, dipropoxybis(acetylacetonato)titanium, titanium isopropoxyoctylene glycol and the like.

Furthermore, in order to enhance the activity of the above catalyst, a basic compound may be used together. Basic compounds which can be used for this purpose include, for example, amines such as octylamine, laurylamine and the like, cyclic amines such as imidazoline, tetrahydropyrimidine, 1,8-diazabicyclo[5.4.0]undec-7-ene and the like, guanidyl group-containing silane compounds such as guanidine propyltris(trimethylsiloxy)silane or a partial hydrolyzates thereof, guanidyl group-containing siloxanes and so forth.

The amount of the catalyst (E) is preferably 0.1 to 10 parts by weight per 100 parts by weight of the component (A). Taking the cure rate of the composition, long-term shelf life of the composition in uncured state, economy and the like into special account, a more preferable range for the amount of the catalyst (E) is 0.5 to 5 parts by weight.

Other ingredients

In addition to the above components (A) to (E), the room temperature curable composition of the present invention may contain other various ingredients, as desired. For example, stabilizers such as methyltrimethoxysilane, methyltripropenoxysilane, vinyltributanoximesilane, methyltriacetoxysilane and the like, reinforcing agents such as fumed silica, precipitated silica, aluminum oxide, ground quartz, carbon powder, talc, bentonite and the like, fibrous fillers such as asbestos, glass fibers, organic fibers and the like, coloring agents such as pigments, dyes and the like, heat resistance improving agents such as red oxide, cerium oxide and the like, cold resistance improving agents, dehydrating agents, adhesion-improving agents such as γ-glycidoxypropyltriethoxysilane and the like, liquid reinforcing agents such as network polysiloxanes comprised of triorganosiloxy units and $SiO_2$ units, and the like can be added to the composition. These ingredients may be added in desired amounts, as required.

Preparation of composition

The composition according to the present invention can be obtained as a one-pack type room temperature curable composition by uniformly mixing desired amounts of the components (A) to (E) and the optional ingredients added as required, in a dry atmosphere. In this case, the component (D) may be mixed in a microencapsulated state, whereby a one-pack type room temperature curable composition with improved shelf life can be obtained. Also, a compound having an active group in a protected state such as an amine compound having an amino group protected in the form of a Schiff base, a compound which does not react with epoxy compounds at room temperature such as 1,2-ethylenebis(isopentylidene), 1,2-ethylenebis(isopropylideneimine), 1,3-propylenebis(isopropylideneimine), 1,6-hexylenebis(isopentylideneimine), p-phenylenebis(isopropylideneimine), and p-phenylenebis(isopentylideneimine), or the like may be used as component (D), whereby a one-pack type room temperature curable composition with improved shelf life can be obtained. Alternatively, the composition of the present invention can be obtained as a two-pack type composition, namely, a composition consisting of two parts which are contained in separate packs and are mixed with each other at the time of use of the composition. Where the composition is prepared as the two-pack type, the two parts in separate packs can be easily formulated for a mixing ratio of 1:1, resulting in good workability.

The composition according to the present invention normally cures easily at 0° to 20° C. in the presence of moisture in air, to form a cured product.

EXAMPLES

The present invention will now be described more in detail with reference to the examples that follow.

Synthesis Example 1

In 80 parts by weight of a dimethylpolysiloxane which is blocked by vinyldiisopropenoxysilyl group at both terminal ends of its molecular chain and has a viscosity of 700 cSt, a monomeric mixture of 70 parts by weight of styrene and 60 parts by weight of n-butyl acrylate was brought into copolymerization using t-butyl peroxybenzoate as a polymerization initiator at 120° C. for 6 hours. The resulting mixture of components (A) and (B) is referred to as Polymer A.

Synthesis Example 2

In 80 parts by weight of a dimethylpolysiloxane which is blocked by trimethoxysilyl group at both terminal ends of its molecular chain and has a viscosity of 8,000 cSt, a monomeric mixture of 70 parts by weight of styrene and 60 parts by weight of n-butyl acrylate was brought into copolymerization using t-butyl peroxybenzoate as a polymerization initiator at 120° C. for 6 hours. The resulting mixture of components (A) and (B) is referred to as Polymer B.

Synthesis Example 3

In 80 parts by weight of a dimethylpolysiloxane which is blocked by trimethoxysilyl group at both terminal ends of its molecular chain and has a viscosity of 900 cSt, a monomeric mixture of 70 parts by weight of styrene and 60 parts by weight of methyl methacrylate was brought into copolymerization using t-butyl peroxybenzoate as a polymerization initiator at 120° C. for 6 hours. The resulting mixture of components (A) and (B) is referred to as Polymer C.

Examples 1 to 5, Comparative Examples 1 to 3

In each of these Examples and Comparative Examples, the components given in Table 1 were mixed in the ratios of amounts given in Table 1, to give a composition.

Each composition thus obtained was formed into a sheet-like shape, 2 mm in thickness, which was left to stand in an atmosphere of 20° C. and 60% RH. After the lapse of 7 days, the cured product obtained was tested to measure hardness, tensile strength and elongation according to JIS K 6301. Hardness measurement was carried out using a Type A spring hardness tester.

The results are given in Table 2.

Besides, the compositions were examined for adhesive properties in adhesion to various adherends. The adherends used were aluminum plates and iron plates.

Each composition was sandwiched between two aluminum plates to become a mass 2.5 cm² in area and 50 μm in thickness, thereby forming a test specimen. Also, the composition was sandwiched between two iron plates to become a mass 2.5 cm² in area and 50 μm in thickness, thereby forming another specimen. The specimens thus formed were left to stand in an atmosphere of 20° C. and 60% RH for 7 days. Then, the specimens were subjected to measurement of adhesive strength under shear at a pulling rate of 50 mm/min, in accordance with JIS K 6301. The results are given in Table 2.

TABLE 1

|  |  |  | Ex. 1 | Ex. 2 | Ex. 3 | Ex. 1 | Ex. 4 | Ex. 2 | Ex. 5 | Ex. 3 |
|---|---|---|---|---|---|---|---|---|---|---|
| Composition (parts by weight) | Component (A) + Component (B) | Polymer A | 80 | — | — | 80 | 80 | 80 | 80 | 80 |
|  |  | Polymer B | — | 80 | — | — | — | — | — | — |
|  |  | Polymer C | — | — | 80 | — | — | — | — | — |
|  | Component (C) | Bis(p-glycidyl-phenyl)propane | 20 | 20 | 20 | — | 20 | — | 20 | — |
|  | Component (D) | 2,4,6-Tris(di-methylamino)phenol | 6 | 6 | 6 | — | — | — | — | — |
|  |  | Triethylene-tetramine | — | — | — | — | 5 | — | 5 | — |
|  |  | γ-Aminopropyl-triethoxysilane | 2 | 2 | 2 | 2 | — | — | — | — |
|  |  | γ(β-Aminoethyl)-aminopropyltri-methoxysilane | — | — | — | — | 2 | 2 | — | — |
|  | Component (E) | Dibutyltin dilaurate | 0.2 | 0.2 | 0.2 | 0.2 | 0.2 | 0.2 | 0.2 | 0.2 |
|  | Other ingredient | γ-Glycidoxy-propyltrimethoxy-silane | — | — | — | — | — | — | 2 | 2 |

TABLE 2

|  |  | Ex. 1 | Ex. 2 | Ex. 3 | Ex. 1 | Ex. 4 | Ex. 2 | Ex. 5 | Ex. 3 |
|---|---|---|---|---|---|---|---|---|---|
| Physical properties | Hardness | 75 | 70 | 80 | 68 | 75 | 63 | 76 | 62 |
|  | Tensile strength (kgf/cm²) | 42 | 40 | 35 | 40 | 40 | 39 | 35 | 41 |
|  | Elongation (%) | 440 | 520 | 360 | 390 | 350 | 400 | 320 | 390 |
| Adhesive strength | Aluminium plate (kg/cm²) | 67 | 66 | 58 | 12 | 61 | 13 | 54 | 8 |
|  | Iron plate (kg/cm²) | 58 | 55 | 54 | 9 | 52 | 10 | 52 | 6 |

What is claimed is:

1. A room temperature curable organopolysiloxane composition comprising:

(A) an organopolysiloxane blocked by a group selected from the group consisting of a silanol group and a hydrolyzable silyl group at a terminal end of molecular chain thereof;

(B) a polymer of a monomer having an ethylenically unsaturated double bond;

(C) an epoxy compound;

(D) a curing agent for the component (C); and (E) a curing catalyst for the component (A), wherein the component (B) is present in an amount of 20 to 250 parts by weight per 100 parts by weight of the component (A);

the component (C) is present in an amount of 1 to 99 parts by weight of the components (A), (B) and (C) in total;

the component (D) is present in an amount of 0.01 to 200 parts by weight per 100 parts by weight of the component (C); and the component (E) is present in an amount of 0.1 to 10 parts by weight per 100 parts by weight of the component (A);

wherein polymer (B) is a polymer selected from the group consisting of polymers of an olefin; polymers of a halogenated olefin; polymers of a vinyl ester; polymers of an aromatic group-containing vinyl compound; polymers of a heterocycle-containing vinyl compound; polymers of a monomer selected from the group consisting of ethylenically unsaturated double bond-containing carboxylic acids and their esters and salts; polymers of an amide group-containing vinyl compound; polymers of a cyano group-containing vinyl compound; polymers of an unsaturated aldehyde compound; polymers of a N-vinyl nitrogen-containing cyclic compound; polymers of a vinylidene compound; polymers of a monomer selected from the group consisting of maleic acid, fumaric acid and their esters and anhydrides; polymers of a monomer selected from the group consisting of stilbene, indene and cumarone; polymers of a polyfunctional olefin compound selected from the group consisting of allyl methacrylate, allyl acrylate, diallyl adipate, methallyl acrylate, methallyl methacrylate, vinyl acrylate, divinylbenzene and vinylcyclohexene; polymers of an ester of an acid selected from the group consisting of acrylic acid and methacrylic acid with a polyhydric alcohol; polymers of a diene compound; and polymers of a vinyl group-containing silicon compound.

2. The composition of claim 1, wherein the component (B) comprises a polymer which has been obtained by polymerization in the presence of the component (A) and which is in the state of being dispersed in the component (A).

3. The composition of claim 1, wherein the organopolysiloxane (A) has the following general formula (1):

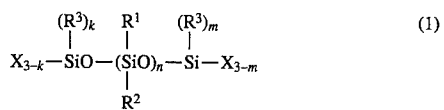

wherein $R^1$ and $R^2$ may be the same or different and are each a substituted or unsubstituted monovalent hydrocarbon group having 1 to 12 carbon atoms, $R^3$ is a substituted or unsubstituted monovalent hydrocarbon group having 1 to 6 carbon atoms, each X stands for a group selected from the group consisting of hydroxyl group and hydrolyzable groups, k and m may be the same or different and are each an integer of 0 to 2, and n is an integer of not less than 10.

4. The composition of claim 1, wherein the polymer (B) comprises a polymer of at least one monomer selected from the group consisting of ethyl acrylate, methyl methacrylate, butyl acrylate, styrene, vinylnaphthalenes, propylene and butylene.

5. The composition of claim 1, wherein the epoxy compound (C) comprises a glycidyl ether-bisphenol A type epoxy resin or an epoxy-modified siloxane compound.

6. The composition of claim 1, wherein the component (D) comprises at least one member selected from the group consisting of amine compounds, acid anhydride compounds, phenolic resins, mercaptan compounds and Lewis acid complex compounds.

7. The composition of claim 6, wherein said amine compound is a compound of which the basic skeleton is comprised of at least one of the structures represented by the following general formulas (2):

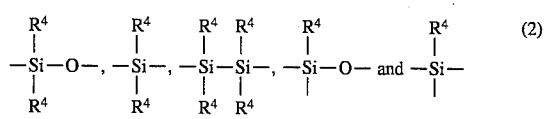

wherein $R^4$ stands for a group selected from the group consisting of alkyl groups, aryl groups, alkenyl groups, trifluoropropyl group, alkoxyl groups, amino groups, aminoxyl groups and acetoxyl groups, and in which an amino group is bonded to said basic skeleton either directly or through a linking group.

8. The composition of claim 1, wherein the component (E) comprises a tin catalyst or a titanium catalyst.

9. A cured product obtained by curing the room temperature curable organopolysiloxane composition as claimed in claim 1.

10. The composition of claim 1, wherein said composition cures at 0°–20° C.

* * * * *